US012591203B2

(12) United States Patent
Yasuda et al.

(10) Patent No.: US 12,591,203 B2
(45) Date of Patent: Mar. 31, 2026

(54) HOLOGRAPHY APPARATUS AND CELL EVALUATION METHOD

(71) Applicant: FUJIFILM CORPORATION, Tokyo (JP)

(72) Inventors: Hideki Yasuda, Kanagawa (JP); Ryusuke Osaki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 289 days.

(21) Appl. No.: 18/476,317

(22) Filed: Sep. 28, 2023

(65) Prior Publication Data

US 2024/0027959 A1 Jan. 25, 2024

Related U.S. Application Data

(63) Continuation of application No. PCT/JP2022/012806, filed on Mar. 18, 2022.

(30) Foreign Application Priority Data

Apr. 9, 2021 (JP) ................................. 2021-066769

(51) Int. Cl.
*G03H 1/22* (2006.01)
*G03H 1/02* (2006.01)
(Continued)

(52) U.S. Cl.
CPC ................. *G03H 1/22* (2013.01); *G03H 1/02* (2013.01); *G03H 1/0443* (2013.01); *G06T 7/0012* (2013.01); *G06T 2207/30024* (2013.01)

(58) Field of Classification Search
None
See application file for complete search history.

(56) References Cited

U.S. PATENT DOCUMENTS

2003/0179424 A1 9/2003 Kihara et al.
2008/0259345 A1 10/2008 Fukutake
(Continued)

FOREIGN PATENT DOCUMENTS

CN 112506019 A 3/2021
JP S58-176511 A 10/1983
(Continued)

OTHER PUBLICATIONS

International Search Report issued in International Application No. PCT/JP2022/012806 on May 31, 2022.
(Continued)

*Primary Examiner* — Dung T Nguyen
(74) *Attorney, Agent, or Firm* — SOLARIS Intellectual

(57) ABSTRACT

A holography apparatus 10 includes an optical system 200 that forms an interference image due to interference between object light L1 and reference light L2. The optical system 200 includes a retarder 30 that is disposed on an optical path of the object light or the reference light, and a rotation mechanism 31 that rotates the retarder 30 with an optical axis of the object light L1 or the reference light L2 as a rotation axis. The holography apparatus 10 includes an imaging unit 40 that captures the interference image, a control unit 50 that derives an evaluation value for the interference image captured by the imaging unit 40 and controls a rotational position of the rotation mechanism 31 based on the evaluation value.

8 Claims, 13 Drawing Sheets

(51) Int. Cl.
    *G03H 1/04*         (2006.01)
    *G06T 7/00*         (2017.01)

(56)              References Cited

U.S. PATENT DOCUMENTS

| | | |
|---|---|---|
| 2013/0260396 A1 | 10/2013 | Akcakir |
| 2013/0274119 A1 | 10/2013 | Knutson et al. |
| 2017/0356846 A1 | 12/2017 | Genuer et al. |
| 2020/0192283 A1* | 6/2020 | Kim ..................... G03H 1/0443 |
| 2020/0342599 A1 | 10/2020 | Nakamura et al. |
| 2022/0083004 A1 | 3/2022 | Nakamura et al. |

FOREIGN PATENT DOCUMENTS

| | | |
|---|---|---|
| JP | H04-269603 A | 9/1992 |
| JP | 2003-015509 A | 1/2003 |
| JP | 2013-531787 A | 8/2013 |
| JP | 2014-010019 A | 1/2014 |
| WO | 2008/123408 A1 | 10/2008 |
| WO | 2018/147473 A1 | 8/2018 |
| WO | 2019/176427 A1 | 9/2019 |
| WO | 2020/261826 A1 | 12/2020 |

OTHER PUBLICATIONS

Written Opinion of the ISA issued in International Application No. PCT/JP2022/012806 on May 31, 2022.

Kemmler, M. et al., "Noninvasive time-dependent cytometry monitoring by digital holography" Journal of Biomedical Optics, SPIE, 1000 20th St. Bellingham WA 98225-6705 USA, vol. 12, No. 6, Jan. 1, 2007, pp. 1-10, , XP003027055.

Cuche, E. et al., "Simultaneous amplitude-contrast and quantitative phase-contrast microscopy by numerical reconstruction of Fresnel off-axis holograms", Applied Optics, Optical Society of America, Washington, DC, US, vol. 38, No. 34, Dec. 1, 1999, pp. 6994-7001, XP002313889.

Extended European Search Report dated Aug. 16, 2024, issued in corresponding EP Patent Application No. 22784484.2.

E. Achimova et al. The Anisotropy of Light Propagation in Biological Tissues, Institute of Applied Physics of Moldova, Chisinau, Moldova, Proceedings of ICNBME—2021, Springer Nature, Jan. 1, 2022, vol. 87, pp. 149-156.

English language translation of the following: Office action dated Sep. 16, 2025 from the JPO in a Japanese patent application No. 2023-512907 corresponding to the instant patent application. This office action translation is submitted now in order to supplement the understanding of the cited references which are being disclosed in the instant Information Disclosure Statement.

\* cited by examiner

HOLOGRAPHY APPARATUS AND CELL EVALUATION METHOD

CROSS-REFERENCE TO RELATED APPLICATIONS

This application is a continuation application of International Application No. PCT/JP2022/012806, filed on Mar. 18, 2022, the disclosure of which is incorporated herein by reference in its entirety. Further, this application claims priority from Japanese Patent Application No. 2021-066769, filed on Apr. 9, 2021, the disclosure of which is incorporated herein by reference in its entirety.

BACKGROUND

1. Technical Field

The disclosed technology relates to a holography apparatus and a cell evaluation method using the holography apparatus.

2. Description of the Related Art

The following technologies are known as technologies related to a cell evaluation method using a digital holography technology. For example, WO2019/176427A describes a determination method for generating a phase difference image of a cell from a hologram obtained by capturing the cells which are an aggregate of a plurality of cells and determining a state of a cell based on the phase difference image and a shape index value corresponding to a shape of the cell.

In addition, the following technologies are known as technologies for avoiding deterioration in coherence between object light and reference light. For example, JP2003-15509A describes an image exposure recording apparatus comprising exposure recording means for exposing and recording a hologram image by irradiating a hologram recording medium with laser light as object light and reference light, polarization state detection means for detecting a polarization state of the laser light transmitted through the hologram recording medium, polarization state variable means for changing the polarization state of the laser light to be incident on the hologram recording medium based on a detection result by the polarization state detection means such that coherence between the object light and the reference light on a recording layer in the hologram recording medium is the highest. A polarizing plate which is an optical element and a photodetector which is intensity detection means are used as the polarization state detection means.

SUMMARY

In the evaluation of the cell using the digital holography technology, for example, the cell cultured on a substrate having light transmittance such as a schale is irradiated with the object light. An interference image (hologram) generated by interference between the object light transmitted through the cell or the substrate and the reference light coherent to the object light is captured by an imaging apparatus. A wave front of a light wave transmitted through the cell is restored by performing numerical calculation based on light propagation on image data of the interference image. In accordance with the digital holography technology, it is possible to acquire three-dimensional information of the cell.

The present inventors have found that contrast of the interference image acquired by using the holography technology deteriorates with a position dependence on the substrate, that is, a variation in the contrast of the interference image is large. It should be noted that, low contrast in the interference image means that a difference in luminance between interference fringes is small. In a case where reduction in the contrast is due to an optical system, the interference image cannot be said to accurately represent information on the cell, and it is considered that the evaluation of the cell based on such an interference image is not appropriate. In particular, in the evaluation of the cell such as embryonic cells that require individual evaluation, an increase in measurement error becomes a major problem.

As a result of diligent studies, the present inventors have found that the variation in the contrast of the interference image is caused by birefringence of the substrate on which the cell is cultured, such as a schale. As illustrated in FIG. 1, the interference image is formed by combining object light L1 transmitted through a cell 60 and a substrate 61 with reference light L2 coherent to the object light. In order to cause the object light L1 and the reference light L2 to interfere with each other, the object light L1 and the reference light L2 need to be pieces of linearly polarized light, respectively, and polarization directions (polarization axes) thereof need to be aligned with each other. However, in a case where the object light L1 is transmitted through the substrate 61, birefringence occurs, and the object light becomes elliptically polarized light. Accordingly, a polarization axis of the object light L1 rotates, and the polarization direction of the object light L1 and the polarization direction of the reference light L2 are not aligned with each other. As a result, coherence between the object light L1 and the reference light L2 deteriorates, and the contrast of the interference image deteriorates. Since the magnitude of the birefringence varies depending on a position on the substrate 61, the contrast of the interference image changes depending on an irradiation position of the object light L1 on the substrate 61.

The disclosed technology has been made in view of the above points, and an object of the disclosed technology is to suppress a variation in contrast of an interference image acquired by using a holography technology.

A holography apparatus according to the disclosed technology includes an optical system that forms an interference image due to interference between object light and reference light, the optical system including a retarder that is disposed on an optical path of the object light or the reference light and a rotation mechanism that rotates the retarder with an optical axis of the object light or the reference light as a rotation axis, an imaging unit that captures the interference image, and a control unit that derives an evaluation value for the interference image captured by the imaging unit, and controls a rotational position of the rotation mechanism based on the evaluation value.

The evaluation value may be a standard deviation or a variance of pixel values of the interference image, and the control unit may control the rotational position of the rotation mechanism such that the evaluation value is maximized. The retarder may be a half-wave plate.

The optical system may further include a polarizer that is disposed on the optical path of the object light, and an attenuator that is disposed on the optical path of the reference light to attenuate a light amount of the reference light. The control unit may control an attenuation amount of the attenuator such that a difference between luminance of an image due to the object light captured by the imaging unit and luminance of an image due to the reference light is in a predetermined range.

A cell evaluation method according to the disclosed technology is a cell evaluation method using the holography apparatus described above including disposing a cell cultured on a substrate having transparency to the object light on the optical path of the object light to acquire the interference image due to the interference between the object light transmitted through the substrate and the cell and the reference light, generating a phase image from the interference image, and evaluating the cell by using the phase image.

It is preferable that the phase image is generated from the interference image due to the interference between the object light transmitted through the substrate and the cell and the reference light, and the interference image is captured in a state where the rotational position of the rotation mechanism is controlled such that a standard deviation or a variance of pixel values of the interference image is maximized.

In accordance with the disclosed technology, it is possible to suppress the variation in the contrast of the interference image acquired by using the holography technology.

BRIEF DESCRIPTION OF THE DRAWINGS

Exemplary embodiments according to the technique of the present disclosure will be described in detail based on the following figures, wherein.

DETAILED DESCRIPTION

Figure 1:
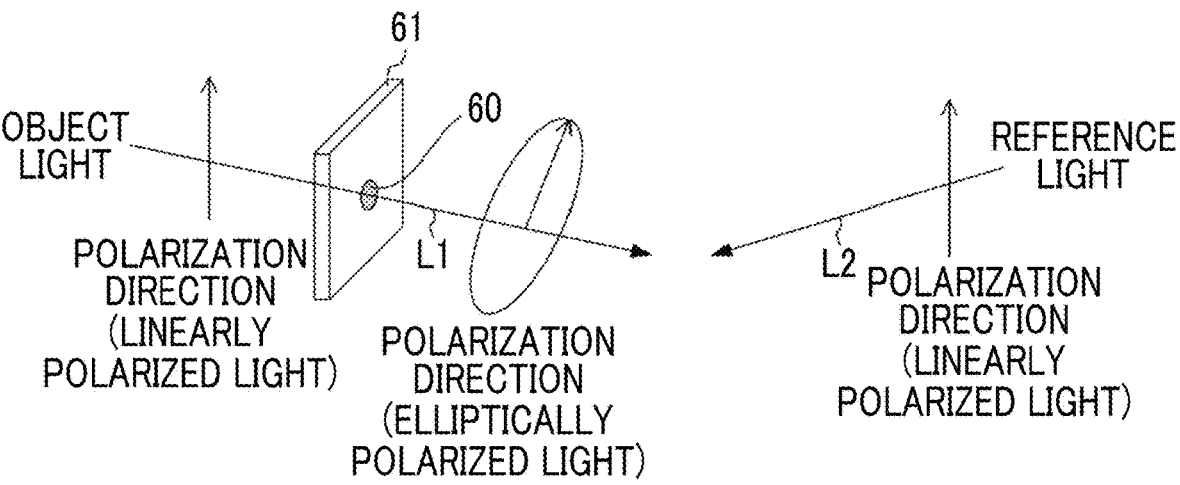
FIG. 1 is a diagram illustrating an example of a procedure of generating an interference image acquired by using a holography technology.

Hereinafter, examples of embodiments of the present invention will be described with reference to the drawings. It should be noted that, in each of the drawings, the same or equivalent components and portions are denoted by the same reference numerals, and the repeated description thereof will be omitted as appropriate.

First Embodiment

Figure 2:
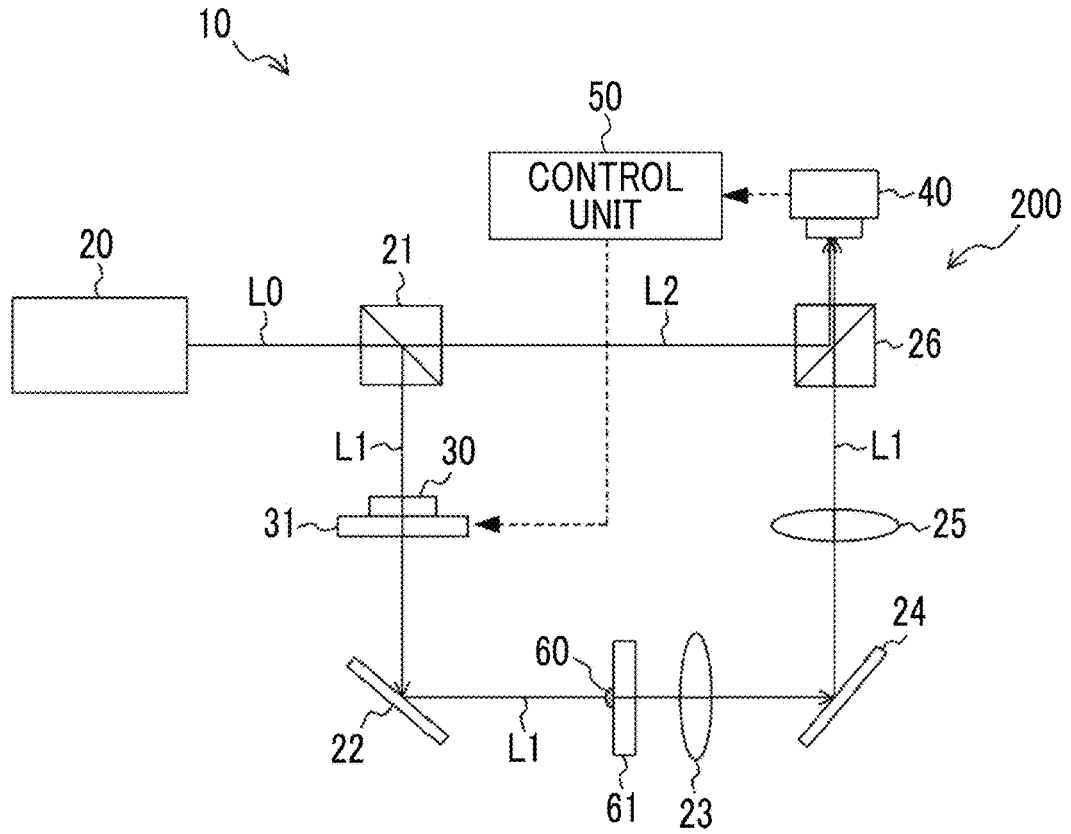
FIG. 2 is a diagram illustrating an example of a configuration of a holography apparatus according to an embodiment of the disclosed technology.

FIG. 2 is a diagram illustrating an example of a configuration of a holography apparatus 10 according to a first embodiment of the disclosed technology. The holography apparatus 10 includes a laser light source 20, an optical system 200, an imaging unit 40, and a control unit 50. The optical system 200 is configured to form an interference image due to interference between object light L1 and reference light L2, and includes a splitter 21, reflection mirrors 22 and 24, an objective lens 23, an imaging lens 25, a combiner 26, a retarder 30, and a rotation mechanism 31. The holography apparatus 10 according to the present embodiment can be used for evaluating cells. A cell 60 to be evaluated is cultured on a substrate 61 and is disposed between the reflection mirror 22 and the objective lens 23 in a state where the cell is attached to the substrate 61 or floats from the substrate 61. A type of the cell 60 is not particularly limited, and may be, for example, an embryonic cell that may be required to perform individual evaluation for each cell.

For example, a HeNe laser having a wavelength of 632.8 nm can be used as the laser light source 20. Laser light L0 which linearly polarized light emitted from the laser light source 20 is divided into two laser light rays by the splitter 21. One of two laser light rays is the object light L1 and the other is the reference light L2. A beam splitter can be used as the splitter 21. The object light L1 is incident on the reflection mirror 22 via the retarder 30 held by the rotation mechanism 31. The cell 60 on the substrate 61 is irradiated with the object light L1 of which a traveling direction is bent by the reflection mirror 22.

The substrate 61 may constitute a container generally used in cell culture, such as a schale or a well plate. The substrate 61 is made of a material such as polystyrene having transparency to the object light L1. The substrate 61 may be made of plastic or glass other than polystyrene. An image due to the object light L1 transmitted through the cell 60 and the substrate 61 is magnified by the objective lens 23. The object light L1 transmitted through the objective lens 23 is bent in the traveling direction by the reflection mirror 24 and is incident on the combiner 26 through the imaging lens 25. On the other hand, the reference light L2 is also incident on the combiner 26. The object light L1 and the reference light L2 are combined by the combiner 26 and are captured on an imaging surface of the imaging unit 40. A beam splitter can be used as the combiner 26.

The interference image (hologram) generated by the interference between the object light L1 and the reference light L2 is captured by the imaging unit 40. The imaging unit 40 comprises an imaging element such as a complementary metal-oxide-semiconductor (CMOS) image sensor, and generates image data of the interference image. The image data of the interference image is supplied to the control unit 50.

The retarder 30 is disposed between the splitter 21 on an optical path of the object light L1 and the reflection mirror 22. The retarder 30 has a function of changing a polarization direction of the object light L1. That is, the retarder 30 emits incidence ray while changing a polarization direction of the incidence ray in a direction corresponding to a rotational position of the retarder 30. The retarder 30 may be, for example, a ½ wavelength plate (λ/2 plate). The rotation mechanism 31 rotates the retarder 30 with an optical axis of the object light L1 as a rotation axis based on a control signal supplied from the control unit 50. The retarder 30 is rotated, and thus, it is possible to determine a polarization direction of the object light L1 transmitted through the retarder 30 to be any direction.

The interference image generated by the object light L1 and the reference light L2 is formed by combining the object light L1 and the reference light L2 transmitted through the cell 60 and the substrate 61. In order to cause the object light L1 and the reference light L2 to interfere with each other, the object light L1 and the reference light L2 need to be pieces of linearly polarized light, respectively, and polarization directions (polarization axes) thereof need to be aligned with each other. However, in a case where the substrate 61 is made of a material that causes birefringence, birefringence is caused in a case where the object light L1 passes through the substrate 61, and the object light L1 is elliptically polarized light. Accordingly, a polarization axis of the object light L1 rotates, and the polarization direction of the object light L1 and the polarization direction of the reference light L2 are not aligned with each other. As a result, coherence between the object light L1 and the reference light L2 deteriorates, and the contrast of the interference image deteriorates. However, the polarization direction of the object light L1 is changed by rotating the retarder 30, and thus, it is possible to cause the polarization direction of the object light L1 to coincide with the polarization direction of the reference light L2. Accordingly, it is possible to suppress the reduction in the contrast of the interference image.

The control unit 50 derives an evaluation value for the interference image captured by the imaging unit 40, and controls the rotational position of the rotation mechanism 31 (and the retarder 30) based on the evaluation value. The evaluation value is an index value indicating the contrast of the interference image, and may be, for example, a standard deviation or a variance of pixel values in the image data of the interference image. The pixel value means a numerical value indicating the luminance of the pixel. The higher the coherence between the object light L1 and the reference light L2, the higher the contrast of the interference image, and the larger the standard deviation or the variance as the evaluation value. It can also be said that the evaluation value is an index value indicating the coherence between the object light L1 and the reference light L2. The control unit 50 controls the rotational position of the rotation mechanism 31 (and the retarder 30) such that the evaluation value is maximized. Specifically, the control unit 50 includes a computer comprising a processor (not illustrated), and performs the following processing.

Figure 3:
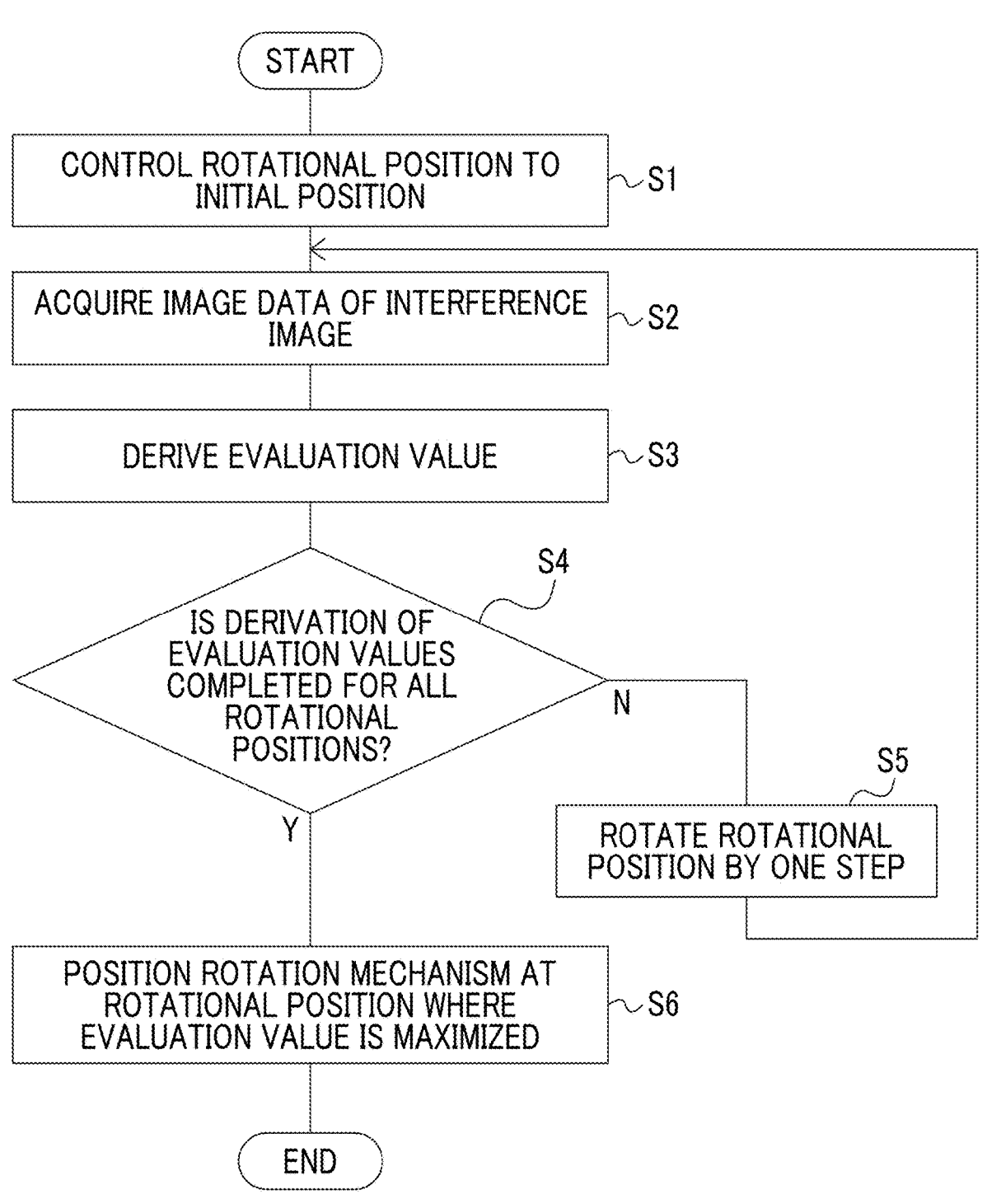
FIG. 3 is a flowchart illustrating an example of a flow of processing executed by a control unit according to the embodiment of the disclosed technology.

FIG. 3 is a flowchart illustrating an example of a flow of processing executed by the control unit 50. In step S1, the control unit 50 sets the rotational position of the rotation mechanism 31 (and the retarder 30) to an initial position. In step S2, the control unit 50 acquires the image data of the interference image from the imaging unit 40. In step S3, the control unit 50 derives the evaluation value for the image data of the interference image acquired in step S2. The control unit 50 derives, for example, the standard deviation of the pixel value as the evaluation value and stores the derived value in a memory (not illustrated).

In step S4, the control unit 50 determines whether or not the derivation of the evaluation values is completed for all predetermined rotational positions. The control unit 50 shifts the processing to step S5 in a case where it is determined that the derivation of the evaluation values is not completed for all the rotational positions, and shifts the processing to step S6 in a case where it is determined that the derivation of the evaluation values is completed.

In step S5, the control unit 50 rotates the rotational position of the rotation mechanism 31 (and the retarder 30) by one step. Accordingly, the retarder 30 rotates the rotational position of the rotation mechanism by one step (for example, 5°) with the optical axis of the object light L1 as the rotation axis. Thereafter, the control unit 50 returns the processing to step S2. That is, the control unit 50 acquires the image data of the interference image in a state where the rotational position of the retarder 30 is rotated by one step, and derives the evaluation value for the image data. The control unit 50 repeats the processing from step S2 to step S5 until, for example, a change amount of the retarder 30 from the initial position in the polarization direction reaches 180°. In a case where the retarder 30 is a ½ wavelength plate (λ/2 plate), the polarization direction of the object light L1 changes by 180° by changing the retarder by 90° from the initial position.

In step S6, the control unit 50 positions the rotation mechanism 31 (and the retarder 30) at a rotational position where the evaluation value stored in the memory is maximized by supplying the control signal to the rotation mechanism 31.

As described above, the holography apparatus 10 according to the embodiment of the disclosed technology includes the optical system 200 that forms the interference image due to the interference between the object light L1 and the reference light L2. The optical system 200 includes the retarder 30 disposed on the optical path of the object light L1 and the rotation mechanism 31 that rotates the retarder 30 with the optical axis of the object light L1 as the rotation axis. The holography apparatus 10 comprises the imaging unit 40 that captures the interference image, and the control unit 50 that derives the evaluation value for the interference image captured by the imaging unit 40 and controls the rotational position of the rotation mechanism 31 (and the retarder 30) based on the evaluation value. An index value indicating a state of the contrast of the interference image such as the standard deviation or the variance of the pixel values in the image data of the interference image is used as the evaluation value. The control unit 50 controls the rotational position of the rotation mechanism 31 (and the retarder 30) such that the evaluation value is maximized.

In accordance with the holography apparatus 10 according to the embodiment of the disclosed technology, even in a situation in which the contrast of the interference image deteriorates due to the birefringence on the substrate 61, the rotational position of the rotation mechanism 31 (and the retarder 30) is controlled such that the evaluation value is maximized, and thus, it is possible to cause the polarization direction of the object light L1 to coincide with the polarization direction of the reference light L2. Accordingly, it is possible to suppress the reduction in the contrast of the interference image. That is, in accordance with the holography apparatus 10, it is possible to suppress the influence of the birefringence on the substrate 61. In a case where the interference image is acquired for the cell present at each position on the substrate 61, whenever the rotational position of the rotation mechanism 31 (and the retarder 30) is controlled, it is possible to suppress a variation in the contrast of the interference image.

Figure 4:
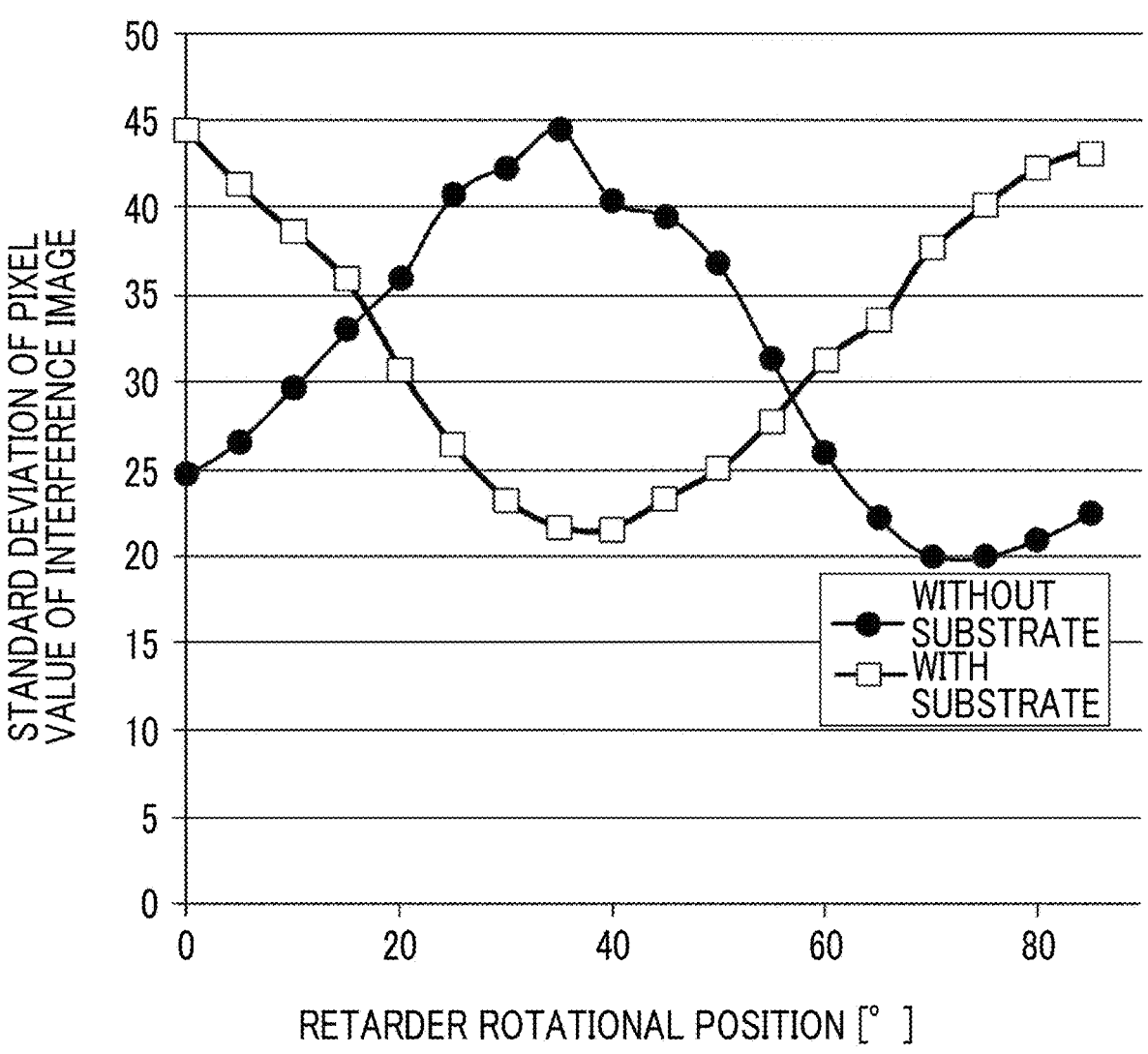
FIG. 4 is a graph representing an example of a relationship between a rotational position of a retarder and a standard deviation of a pixel value of image data of the interference image according to the embodiment of the disclosed technology.

FIG. 4 is a graph representing an example of a relationship between the rotational position of the retarder 30 and the standard deviation of the pixel value of the image data of the interference image. FIG. 4 illustrates a relationship between a case where the substrate 61 is disposed on the optical path of the object light L1 (with the substrate) and a case where the substrate 61 is not disposed (without the substrate). As illustrated in FIG. 4, the substrate 61 that causes birefringence is disposed on the optical path of the object light L1, and thus, the standard deviation with which the rotational position of the retarder 30 is 0° is reduced as compared with a case where the substrate 61 is not disposed. However, it has been confirmed that the standard deviation is increased and a maximum value is taken at a specific rotational position (near 35°) by changing the rotational position of the retarder 30. In addition, the maximum value of the standard deviation in a case where the substrate 61 was disposed and the maximum value of the standard deviation in a case where the substrate 61 was not disposed are equal. As a result, due to the control of the rotational position of the retarder 30, the contrast of the interference image can be improved to such an extent that the influence of the birefringence of the substrate 61 can be offset.

Figure 5:
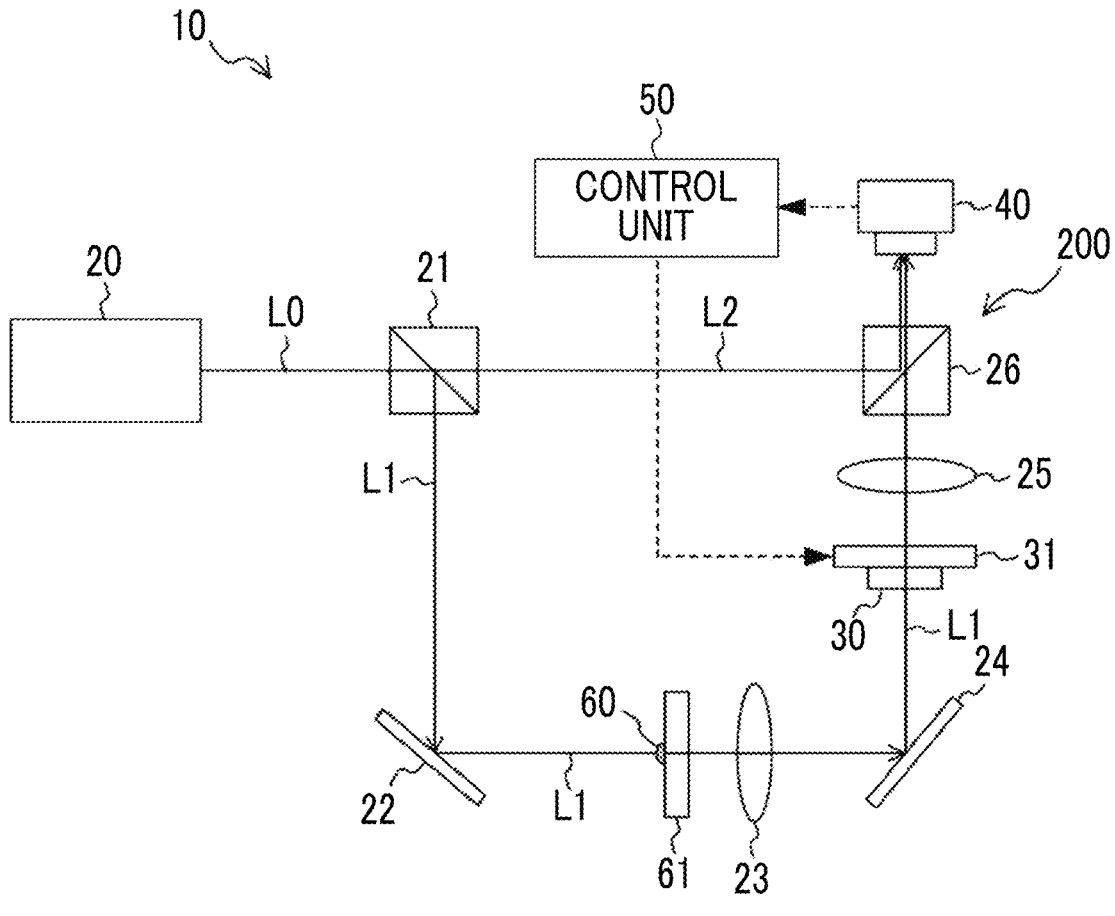
FIG. 5 is a diagram illustrating an example of a configuration of the holography apparatus according to the embodiment of the disclosed technology.
Figure 6:
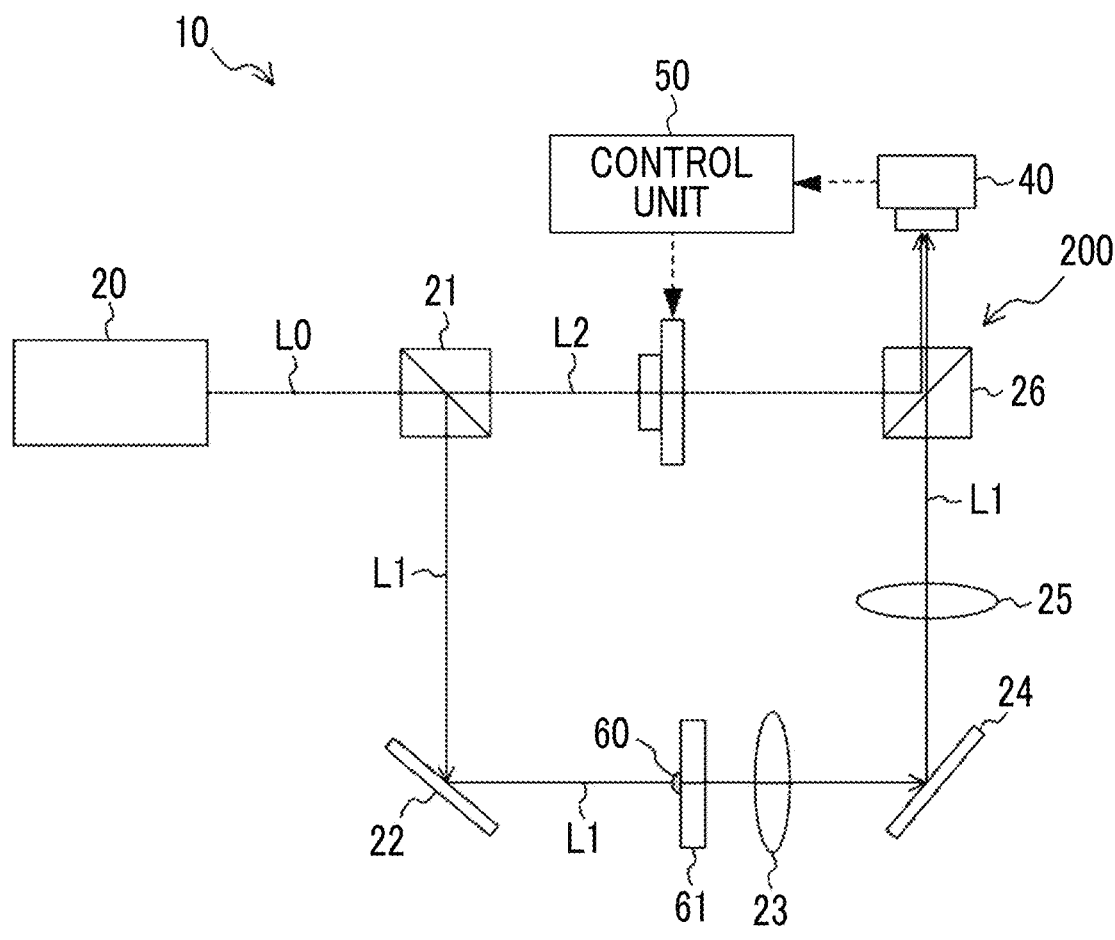
FIG. 6 is a diagram illustrating an example of the configuration of the holography apparatus according to the embodiment of the disclosed technology.

FIGS. 5 and 6 are diagrams illustrating examples of configurations of holography apparatuses 10 according to modified examples, respectively. As illustrated in FIG. 5, it is also possible to dispose the retarder 30 and the rotation mechanism 31 on a rear side in the traveling direction of the object light L1 with respect to the cell 60 and the substrate 61. In the example illustrated in FIG. 5, the retarder 30 and the rotation mechanism 31 are disposed between the reflection mirror 24 and the imaging lens 25. In this case, it is also possible to suppress the variation in the contrast of the interference image. In addition, as illustrated in FIG. 6, the retarder 30 and the rotation mechanism 31 may be disposed on an optical path of the reference light L2. In this case, it is also possible to suppress the variation in the contrast of the interference image.

Second Embodiment

Figure 7:
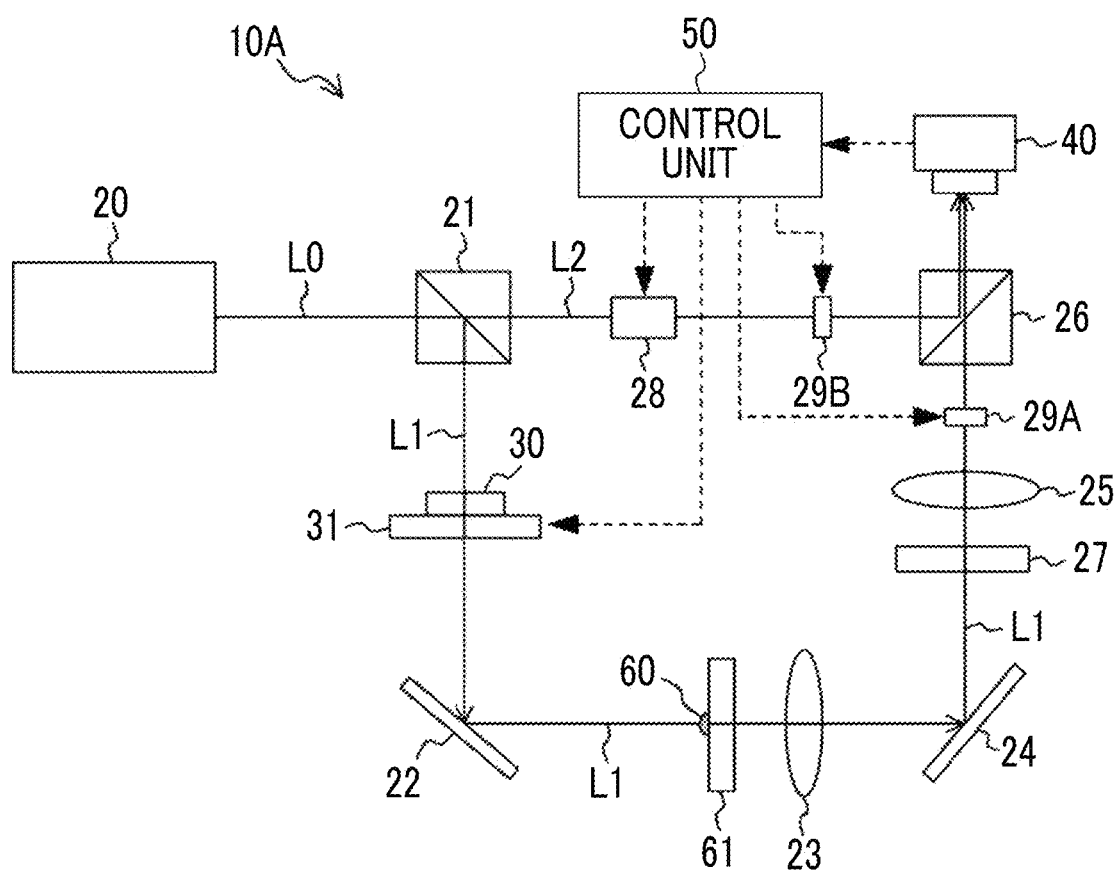
FIG. 7 is a diagram illustrating an example of the configuration of the holography apparatus according to the embodiment of the disclosed technology.

FIG. 7 is a diagram illustrating an example of a configuration of a holography apparatus 10A according to a second embodiment of the disclosed technology. The holography apparatus 10A according to the present embodiment is different from the holography apparatus 10 (see FIG. 2) according to the first embodiment in that a polarizer 27, an attenuator 28, a first shutter 29A, and a second shutter 29B (see FIG. 2) are further included. The polarizer 27 is disposed on the optical path of the object light L1. In the example illustrated in FIG. 7, the polarizer 27 is disposed between the reflection mirror 24 and the imaging lens 25. The polarizer 27 is a polarizing filter having a function of removing a polarization component unnecessary for forming the interference image, which is included in the elliptically polarized light generated by the object light L1 transmitting through the substrate 61.

The attenuator 28 is disposed on the optical path of the reference light L2. The attenuator 28 has a function of attenuating the reference light L2 with an attenuation amount corresponding to the control signal supplied from the control unit 50. The object light L1 passes through the polarizer 27, and thus, a light amount of the object light L1 is reduced. In a case where a light amount of the reference light L2 is not attenuated, the light amounts of the object light L1 and the reference light L2 are non-uniform. Therefore, the control unit 50 controls an attenuation amount of the attenuator 28 such that an average pixel value (average luminance value) of the image data of the image due to only the object light L1 captured by the imaging unit 40 and an average pixel value (average luminance value) of the image data due to only the reference light L2 are the same.

The first shutter 29A is disposed on the optical path of the object light L1. In the example illustrated in FIG. 7, the first shutter 29A is disposed between the imaging lens 25 and the combiner 26, but may be disposed at any place as long as the first shutter is on the optical path of the object light L1. The first shutter 29A switches between passing and blocking the object light L1 in response to the control signal supplied from the control unit 50.

The second shutter 29B is disposed on the optical path of the reference light L2. In the example illustrated in FIG. 7, the second shutter 29B is disposed between the attenuator 28 and the combiner 26, but may be disposed at any place as long as the second shutter is on the optical path of the reference light L2. The second shutter 29B switches between passing and blocking the reference light L2 in response to the control signal supplied from the control unit 50.

Figure 8:
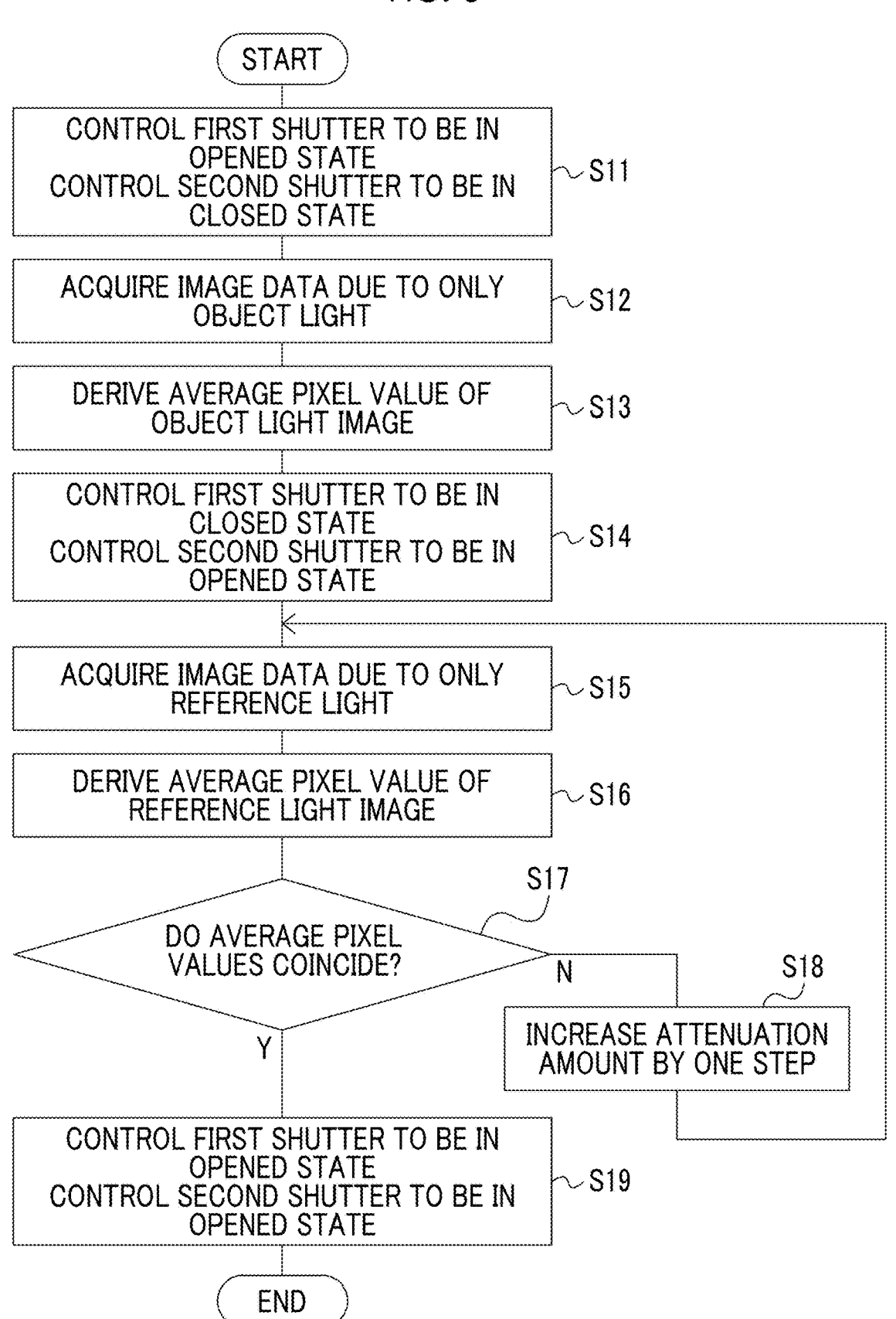
FIG. 8 is a flowchart illustrating an example of a flow of processing executed by the control unit according to the embodiment of the disclosed technology.

FIG. 8 is a flowchart illustrating an example of a flow of processing executed by the control unit 50 according to the present embodiment. Each processing illustrated in FIG. 8 is executed after the processing illustrated in FIG. 3 is completed.

In step S11, the control unit 50 controls the first shutter 29A to be in an opened state and controls the second shutter 29B to be in a closed state. Accordingly, the image due to only the object light L1 is captured by the imaging unit 40. In step S12, the control unit 50 acquires the image data of the image due to only the object light L1 from the imaging unit 40. In step S13, the control unit 50 derives an average pixel value (average luminance value) of an object light image indicated by the image data acquired in step S12, and stores the derived value in a memory (not illustrated).

In step S14, the control unit 50 controls the first shutter 29A to be in the closed state and controls the second shutter 29B to be in the opened state. Accordingly, the image due to only the reference light L2 is captured by the imaging unit 40. In step S15, the control unit acquires the image data of the image due to only the reference light L2 from the imaging unit 40. In step S16, the control unit 50 derives an average pixel value (average luminance value) of a reference light image indicated by the image data acquired in step S15, and stores the derived value in a memory (not illustrated).

In step S17, the control unit 50 determines whether or not the average pixel value (average luminance value) of the object light image stored in the memory and the average pixel value (average luminance value) of the reference light image coincide with each other. The control unit 50 shifts the processing to step S18 in a case where it is determined that the average pixel values (average luminance values) do not coincide with each other, and shifts the processing to step S19 in a case where it is determined that the average pixel values (average luminance values) coincide with each other.

In step S18, the control unit 50 increases the attenuation amount of the attenuator 28 by one step, and returns the processing to step S15. That is, the control unit 50 performs the acquisition of the image data, the storing of the image data in the memory, and the derivation of the average pixel value (average luminance value) of the reference light image in a state where the attenuation amount of the attenuator 28 is increased by one step. The control unit performs the processing from step S15 to step S18 until the average pixel value (average luminance value) of the object light image stored in the memory and the average pixel value (average luminance value) of the reference light image coincide with each other. In step S19, the control unit 50 controls the first shutter 29A to be in the opened state and controls the second shutter 29B to be in the opened state.

In accordance with the holography apparatus 10A according to the present embodiment, the polarization component unnecessary for forming the interference image, which is included in the elliptically polarized light generated by the object light L1 transmitting through the substrate 61, is removed by the polarizer 27. In addition, the attenuation amount of the attenuator 28 is controlled such that the light amount of the object light L1 and the light amount of the reference light L2 are the same. Accordingly, an effect of suppressing the reduction in the contrast of the interference image and an effect of suppressing the variation in the contrast of the interference image are promoted.

It should be noted that, in the present embodiment, a case where the attenuation amount of the attenuator 28 is controlled such that the luminance of the image due to the object light L1 and the luminance of the image due to the reference light L2 which are captured by the imaging unit 40 coincide with each other has been illustrated. However, the attenuation amount of the attenuator 28 may be controlled such that a difference between the luminance of the image due to the object light L1 and the luminance of the image due to the reference light L2 is within a predetermined range.

Examples

Interference images were formed by using the holography apparatus 10 according to the first embodiment (see FIG. 2), the holography apparatus 10A according to the second embodiment (see FIG. 7), and a holography apparatus according to a comparative example (not illustrated), and contrasts and variations of the interference images were compared.

The components of the holography apparatuses are represented in Table 1 below. The holography apparatus 10 according to the first embodiment has a configuration that does not comprise the polarizer and the attenuator among the components represented in Table 1. The holography apparatus according to the comparative example has a configuration that does not comprise the retarder, the rotation mechanism, the polarizer, and the attenuator among the components represented in Table 1. That is, the holography apparatus according to the comparative example does not have means for correcting a fluctuation in the polarization direction of the object light due to the birefringence of the substrate 61.

TABLE 1

| Component | Manufacturer | Model number |
|---|---|---|
| Laser light source | Thorlabs | HNL100LB |
| Splitter | Thorlabs | TW630R5F1 |
| Retarder | Thorlabs | WPHSM05-633 |
| Rotation mechanism | Thorlabs | ELL14 |
| Substrate | Cooper Surgical | 38Special GPS |
| Objective lens | Nikon | CFI Plan Apochromat Lambda 10x |
| Imaging lens | Edmund Optics | TS Achromatic lens 50 × 100 VIS-NIR INK |
| Combiner | Thorlabs | BP250 |
| Imaging unit | Baumer | VCXU-50 |
| Control unit | DELL | Precision 7820T |
| Polarizer | SIGMAKOKI | SPF-50C-32 |
| Attenuator | Thorlabs | V600F |

Embryonic cells were cultured in 12 wells of the substrate. In the holography apparatuses, pieces of image data of interference images of embryonic cells were acquired for a total of three substrates at 12 locations per substrate. That is, the number of acquired interference images in the holography apparatuses is 36. A standard deviation of a pixel value was derived for each of the acquired image data of the interference image.

Figure 9:
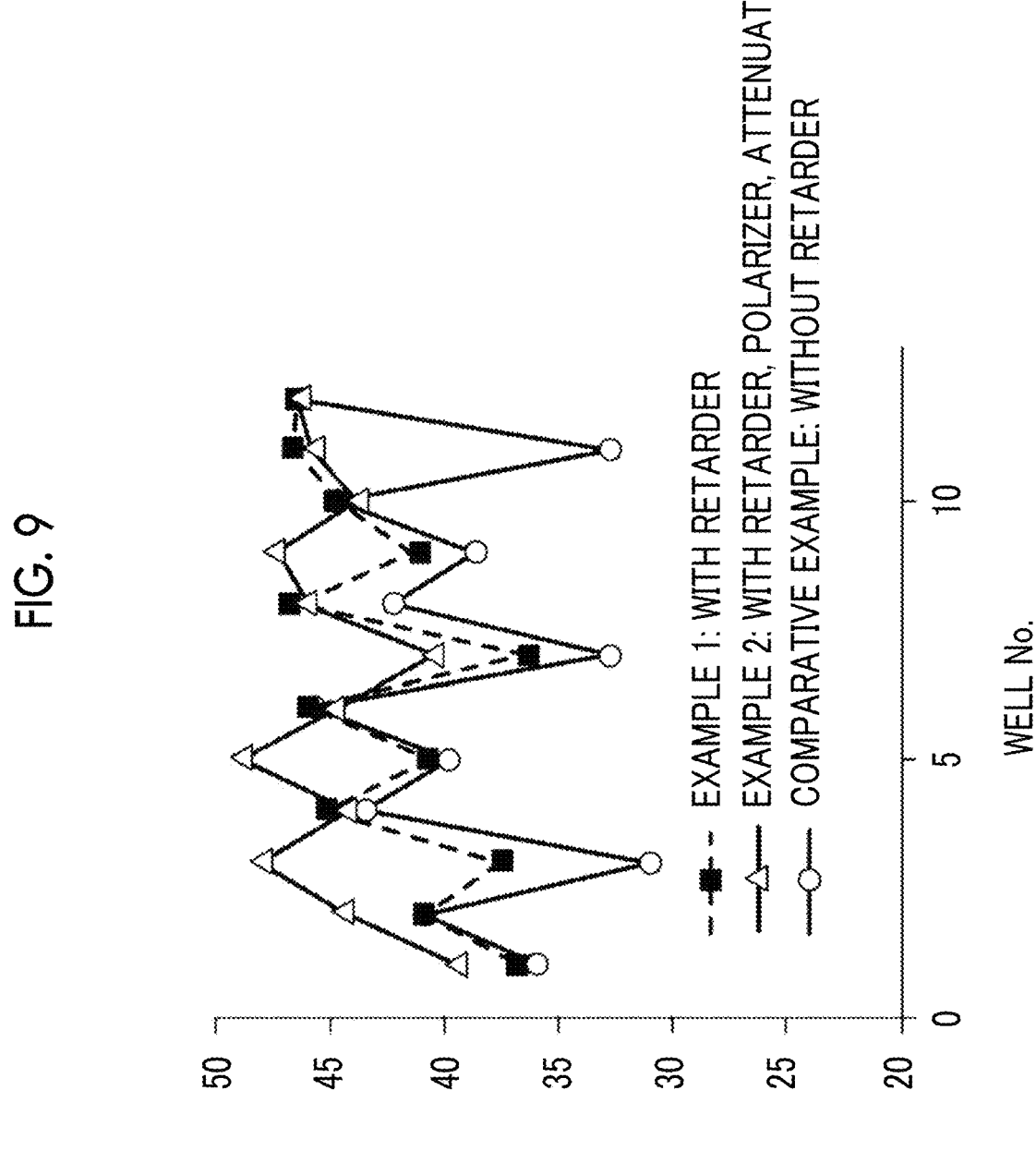
FIG. 9 is a graph representing results of comparing standard deviations for each well number corresponding to an imaging position of the interference image between the apparatuses.
Figure 10:
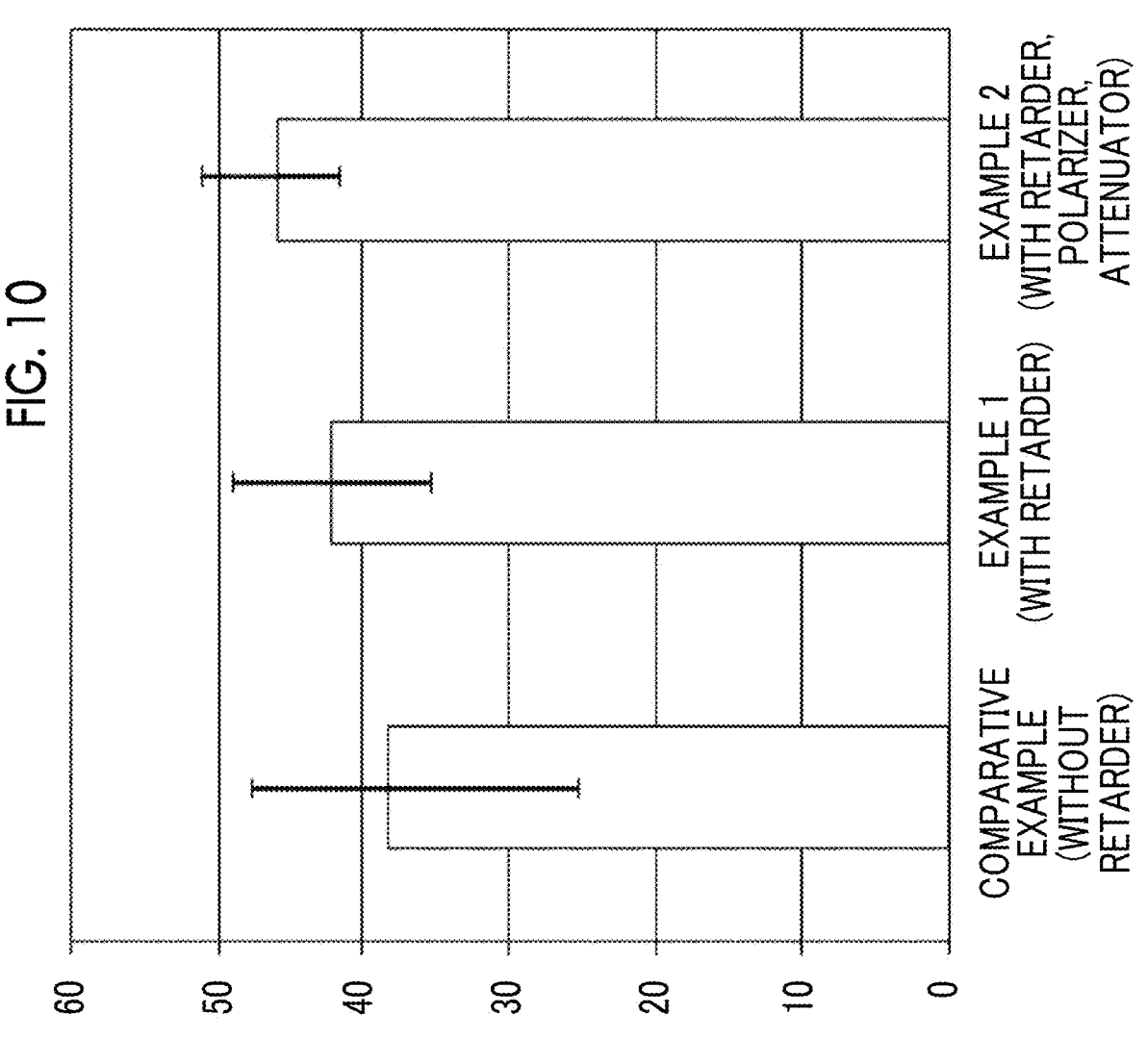
FIG. 10 is a graph representing results of comparing an average value, a maximum value, and a minimum value of standard deviations of the pixel values acquired at 36 locations on a substrate between the apparatuses.

FIG. 9 is a graph representing results of comparing the standard deviations for well numbers corresponding to imaging positions of the interference images between the apparatuses. FIG. 10 is a graph representing results of comparing an average value, a maximum value, and a minimum value of 36 locations of the standard deviations between the apparatuses. In FIGS. 9 and 10, Example 1 corresponds to the holography apparatus 10 according to the first embodiment, Example 2 corresponds to the holography apparatus 10A according to the second embodiment, and a comparative example corresponds to the holography apparatus according to the comparative example.

As illustrated in FIGS. 9 and 10, it was confirmed that the holography apparatus comprises the retarder as means for correcting the fluctuation in the polarization direction of the object light due to the birefringence of the substrate 61, and thus, the standard deviation of the pixel value of the interference image was increased and the variation in the standard deviation was decreased. As a result, due to the correction of the polarization direction by the retarder, the reduction in the contrast of the interference image due to the birefringence of the substrate 61 is suppressed, and the variation in the contrast is suppressed.

[Cell Evaluation Method]

Hereinafter, a cell evaluation method according to an embodiment of the disclosed technology will be described. The cell evaluation method according to the present embodiment uses the holography apparatus 10 according to the first embodiment or the holography apparatus 10A according to the second embodiment described above.

The cell evaluation method according to the present embodiment includes acquiring the interference image generated by the object light L1 transmitted through the substrate 61 and the cell 60 and the reference light L2 by disposing the cell 60 cultured on the substrate 61 having transparency to the object light L1 on the optical path of the object light L1, generating a phase image from the interference image, and evaluating the cell by using the phase image.

Hereinafter, an example of a method for acquiring the phase image from the interference image will be described with reference to FIGS. 11A to 11D. It should be noted that, FIGS. 11A to 11D are acquired for aggregates (spheres) of induced pluripotent stem cells (iPS cells).

Figure 11A:
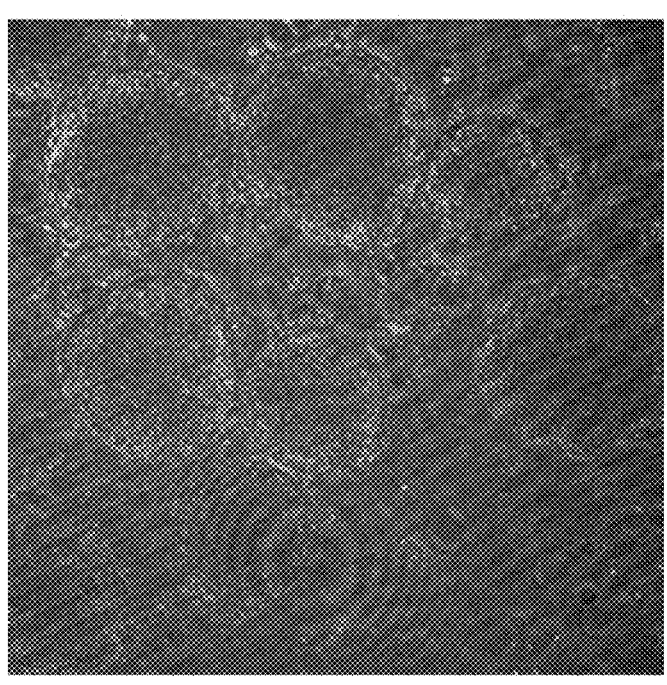
FIG. 11A is a diagram illustrating an example of an interference image of an aggregate.
Figure 11B:
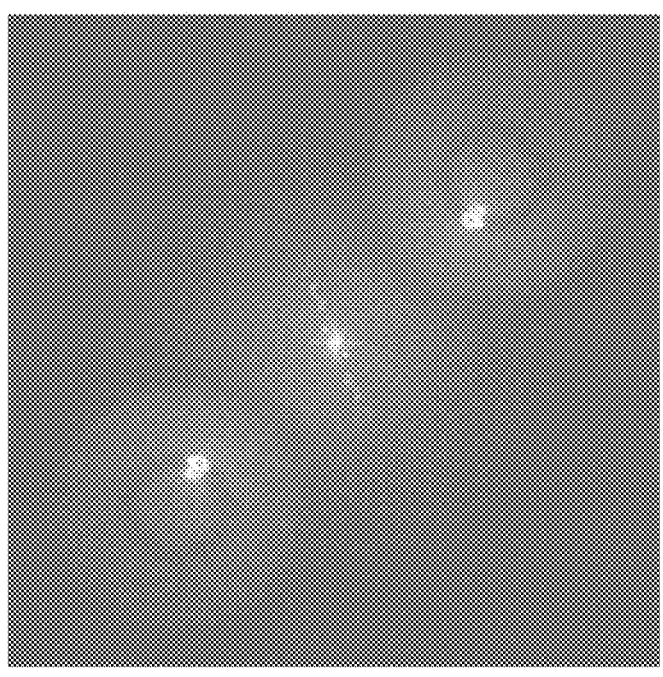
FIG. 11B is a diagram illustrating an example of a Fourier-transformed image of the aggregate.

First, an interference image (hologram) of a cell illustrated in FIG. 11A acquired by the imaging unit 40 is trimmed to have a size of, for example, 2048×2048, and is then subjected to two-dimensional Fourier transform. FIG. 11B is an example of a Fourier-transformed image of the cell obtained by this processing. FIG. 11B illustrates an image based on direct light, object light, and conjugated light.

Subsequently, a position of the object light is specified by specifying a deviation amount of the object light with respect to the direct light in the Fourier-transformed image, and a complex amplitude component of only the object light is extracted by frequency filtering processing using a mask of a circular opening having a radius of 250 pixels.

Subsequently, for example, an angular spectrum method is applied to restore the image showing the phase of the cell at any spatial position. Specifically, an angular spectrum $U(f_x, f_y; 0)$ of the Fourier-transformed image of a wave front $u(x, y; 0)$ captured by the imaging surface of the imaging unit 40 is obtained. Subsequently, as represented in Equation (1) below, the angular spectrum $U(f_x, f_y; 0)$ is multiplied by a transfer function $H(f_x, f_y; z)$, and thus, a wave front at any position z in an optical axis direction (z direction) is reproduced. Here, the transfer function $H(f_x, f_y; z)$ is a frequency response function (Fourier transform of an impulse response function (green function)).

$$U(f_x, f_y; z) = U(f_x, f_y; 0)H(f_x, f_y; z), H = e^{z\frac{2\pi}{\lambda}\sqrt{1-(\lambda f_x)^2-(\lambda f_y)^2}} \quad (1)$$

Subsequently, as represented in Equation (2) below, an inverse Fourier transform is performed on a wave front $U(f_x, f_y; z)$ at the position z in the optical axis direction (z direction), and thus, a solution $u(x, y; z)$ at the position z is derived.

$$
\begin{aligned}
u(x, y; z) &= F^{-1}[U(f_x, f_y; z)] \quad (2)\\
&= F^{-1}[U(f_x, f_y; 0)H(f_x, f_y; z)]\\
&= F^{-1}[F[u(x, y; 0)]H(f_x, f_y; z)]
\end{aligned}
$$

Figure 11C:
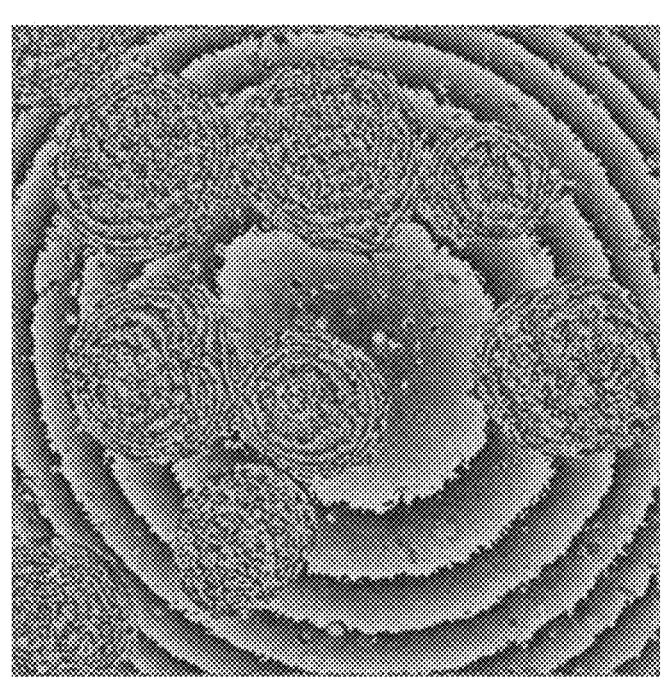
FIG. 11C is a diagram illustrating an example of a phase difference image of an aggregate before unwrapping.

Subsequently, the phase image is generated by deriving a phase φ for $u(x, y; z)$ as represented in Equation (3) below. FIG. 11C is an example of a phase image before unwrapping obtained by each processing described above.

$$\phi = \arctan\left(\frac{Im(u)}{Re(u)}\right) \quad (3)$$

Figure 11D:
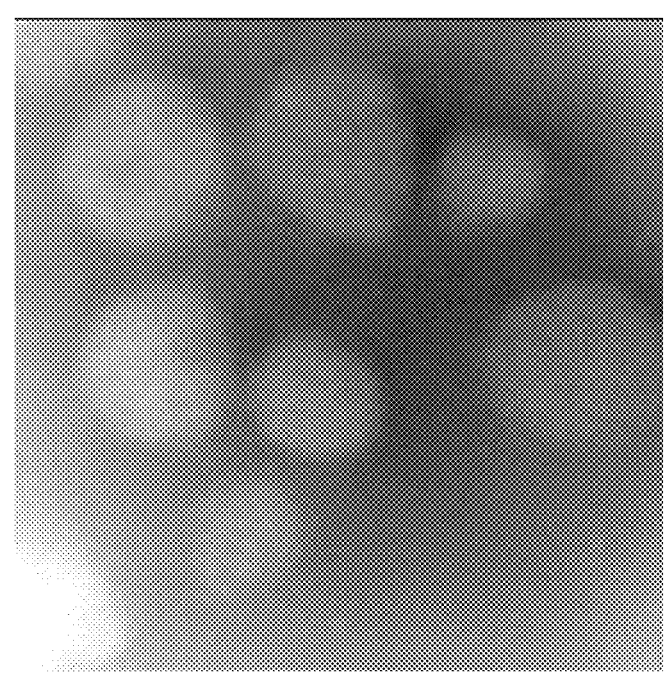
FIG. 11D is a diagram illustrating an example of a phase difference image of an aggregate after unwrapping.

A phase in a phase difference image before unwrapping illustrated in FIG. 11C is convolved to a value of 0 to $2\pi$. Therefore, for example, portions of $2\pi$ or more are joined by applying a phase connection (unwrapping) method such as unweighted least squares or Flynn's algorithm, and thus, a final phase image as illustrated in FIG. 11D can be obtained. It should be noted that, many unwrapping methods have been proposed, and an appropriate method that does not cause phase mismatch may be appropriately selected.

Figure 12:
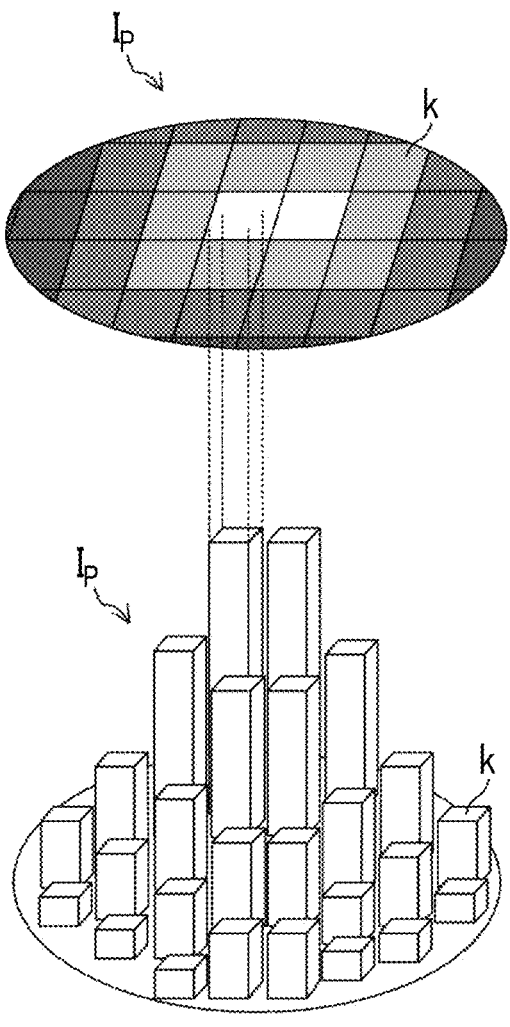
FIG. 12 is a diagram illustrating a concept of the phase difference image according to the embodiment of the disclosed technology.

Hereinafter, the phase image will be described. FIG. 12 is a diagram illustrating a concept of a phase image $I_P$. In a lower part of FIG. 12, a phase amount at each pixel k of the phase image $I_P$ is three-dimensionally displayed. In an upper part of FIG. 12, the phase amount at each pixel k of the phase image $I_P$ is illustrated on a plane in gray scale.

Here, in a case where a phase of a background (region where the cell is not present) present in the same focal plane of the phase image $I_P$ is $P_B$ and a phase of a region where the cell is present is $P_S$, a phase amount P in the phase image $I_P$ is represented by Equation (4) below. In addition, the term "phase" in the present specification is a phase of an electric field amplitude in a case where light is regarded as an electromagnetic wave, and is used in a more general sense.

$$P=P_S-P_B \quad (4)$$

In addition, a phase amount $P_k$ at each pixel k of the phase image $I_P$ can be represented by Equation (5) below. Here, $n_k$ is a refractive index of the cell at a portion corresponding to each pixel k of the phase image $I_P$, $d_k$ is a thickness of the cell at the portion corresponding to each pixel k of the phase image $I_P$, and $\lambda$ is a wavelength of the object light in a hologram optical system.

$$P_k = 2\pi\frac{n_k \cdot d_k}{\lambda} \quad (5)$$

The phase image of the cell is an image showing an optical path length distribution of the object light transmitted through the cell. Since an optical path length in the cell corresponds to a product of the refractive index of the cell and the thickness of the cell, the phase image of the cell includes information on the refractive index and the thickness (shape) of the cell as represented in Equation (5).

An example of the cell evaluation method using the phase image is a method using a total phase amount $P_A$ derived from the phase image. The total phase amount $P_A$ is represented by Equation (6) below. Here, s is an area of each pixel k of the phase image, and $v_k$ is a volume of the cell at the portion corresponding to each pixel k of the phase image. As represented in Equation (6), the total phase amount $P_A$ corresponds to an amount obtained by integrating and accumulating the phase amounts $P_k$ for the pixels of the phase image of the cell for all the pixels k. The pixel value of the phase image corresponds to the phase amount $P_k$.

$$P_A = \sum_{k=0}^{N} P_k \cdot s = \frac{2\pi}{\lambda}\sum_{k=0}^{N} n_k \cdot d_k \cdot s = \frac{2\pi}{\lambda}\sum_{k=0}^{N} n_k \cdot v_k \quad (6)$$

Figure 13:
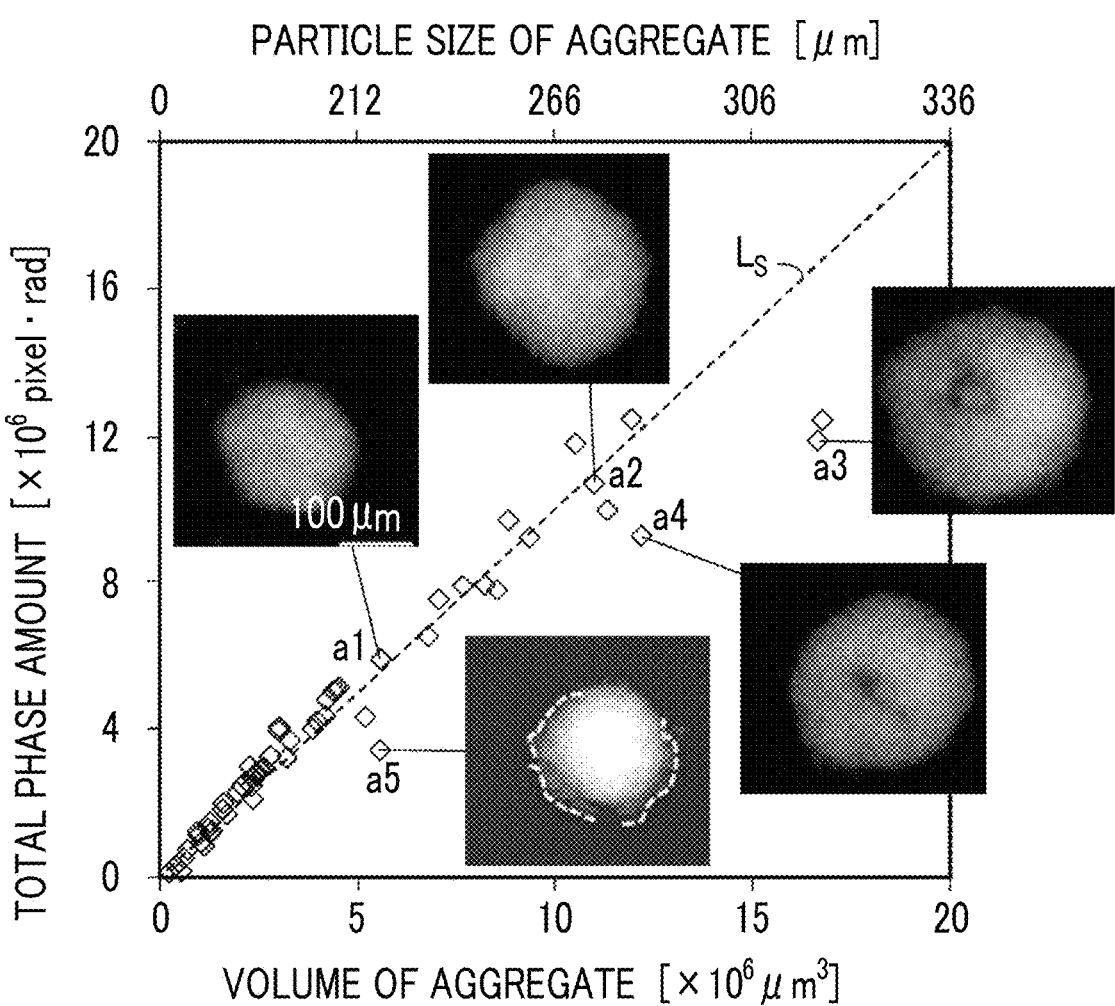
FIG. 13 is a graph representing results of acquiring correlation characteristics between a volume of the aggregate and a total phase amount.

FIG. 13 is a graph representing results of acquiring correlation characteristics between a volume of an aggregate (sphere) of iPS cells and the total phase amount $P_A$. As illustrated in FIG. 13, it was confirmed that the total phase amount $P_A$ and the volume of the aggregate were in a proportional relationship. In FIG. 13, a trend line $L_S$ indicating a standard of correlation between the volume of the aggregate and the total phase amount $P_A$ is illustrated together with plots. A regression line derived from the plots illustrated in FIG. 13 is applied as the trend line $L_S$.

FIG. 13 illustrates phase images of aggregates corresponding to plots a1 and a2 present on the trend line $L_S$, and phase images of aggregates corresponding to plots a3, a4, and a5 present at positions deviated from the trend line $L_S$. For the aggregates corresponding to the plots a1 and a2 present on the trend line $L_S$, a phase image in which the luminance is uniform over all the aggregates is obtained. As a result, a plurality of cells constituting the aggregates are homogeneous, and densities of the cells in the aggregates are uniform. On the other hand, for the aggregates corresponding to the plots a3 and a4 present at the positions deviated from the trend line $L_S$, a phase image in which luminance of a central portion is lower than luminance of other portions is obtained. As a result, the plurality of cells constituting the aggregates are an inhomogeneous, and the densities of the cells in the aggregates are non-uniform. In addition, for the aggregate corresponding to the plot a5 present at the position deviated from the trend line $L_S$, a phase difference image in which unevenness of a contour line of the aggregate is remarkable is obtained. As a result, an abnormality occurs in the cells constituting the aggregates.

From the above results, it can be said that it is possible to determine the state of the aggregate by using the correlation between the total phase amount $P_A$ and the volume of the aggregate. In addition, it can be said that it is possible to determine the state of the aggregate in accordance with a degree of deviation from the trend line $L_S$ in a correlation for the aggregate to be determined by comparing the trend line $L_S$ indicating the correlation between the total phase amount $P_A$ and the volume of the aggregate with the correlation between the total phase amount $P_A$ of the aggregate to be determined and the volume of the aggregate. Specifically, it can be said that it is possible to determine the state of each aggregate in accordance with the degree of deviation from the trend line $L_S$ of the plot of the aggregate to be determined which is plotted on the graph in which the volume of the aggregate is taken on one axis and the total phase amount $P_A$ is taken on the other axis. Consequently, for example, for the aggregate in which a minus width of the total phase amount $P_A$ from the trend line $L_S$ is equal to or more than a threshold value, it is possible to determine that there is an abnormality in at least one of the density, homogeneity of the plurality of cells included in the aggregate, or an outer shape of the sphere.

In the cell evaluation using the phase image, it is preferable that a phase image generated from a high-contrast interference image is used. That is, it is preferable that a phase image generated from an interference image captured in a state where the rotational position of the rotation mechanism 31 (and the retarder 30) is controlled such that the standard deviation or the variance of the pixel values in the interference image is maximized is used.

It should be noted that, the disclosure of Japanese Patent Application No. 2021-066769 filed on Apr. 9, 2021 is incorporated herein by reference in its entirety. In addition, all documents, patent applications, and technical standards described in the specification are incorporated herein by references to the same extent as the incorporation of the individual documents, patent applications, and technical standards by references are described specifically and individually.

What is claimed is:

1. A holography apparatus comprising:
an optical system that forms an interference image due to interference between object light and reference light, the optical system including a retarder that is disposed on an optical path of the object light or the reference light and a rotation mechanism that rotates the retarder with an optical axis of the object light or the reference light as a rotation axis;
an imaging unit that captures the interference image; and
a control unit configured to derive an evaluation value for the interference image captured by the imaging unit, and control a rotational position of the rotation mechanism based on the evaluation value.

2. The holography apparatus according to claim 1, wherein the evaluation value is a standard deviation or a variance of pixel values of the interference image, and the control unit controls the rotational position of the rotation mechanism such that the evaluation value is maximized.

3. The holography apparatus according to claim 1, wherein the retarder is a half-wave plate.

4. The holography apparatus according to claim 1, wherein the optical system further includes
a polarizer that is disposed on the optical path of the object light, and
an attenuator that is disposed on the optical path of the reference light to attenuate a light amount of the reference light.

5. The holography apparatus according to claim 4, wherein the control unit controls an attenuation amount of the attenuator such that a difference between luminance of an image due to the object light captured by the imaging unit and luminance of an image due to the reference light is in a predetermined range.

6. The holography apparatus according to claim 4, wherein the optical system further comprises a first shutter disposed on the optical path of the object light; and
a second shutter disposed on the optical path of the reference light.

7. A cell evaluation method using the holography apparatus according to claim 1, the method comprising:
disposing a cell cultured on a substrate having transparency to the object light on the optical path of the object light to acquire the interference image due to the interference between the object light transmitted through the substrate and the cell and the reference light;
generating a phase image from the interference image; and
evaluating the cell by using the phase image.

8. The cell evaluation method according to claim 7, wherein the phase image is generated from the interference image due to the interference between the object light transmitted through the substrate and the cell and the reference light, and the interference image is captured in a state where the rotational position of the rotation mechanism is controlled such that a standard deviation or a variance of pixel values of the interference image is maximized.

* * * * *